United States Patent
Cambridge et al.

(10) Patent No.: US 7,409,720 B1
(45) Date of Patent: *Aug. 5, 2008

(54) VIRUS PREDICTION SYSTEM AND METHOD

(75) Inventors: Rodney D. Cambridge, Middlesex (GB); Fearuz Ali, Bedfordshire (GB)

(73) Assignee: McAfee, Inc., Santa Clara, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/095,248

(22) Filed: Mar. 30, 2005

Related U.S. Application Data

(63) Continuation of application No. 09/916,969, filed on Jul. 26, 2001, now Pat. No. 7,010,696.

(60) Provisional application No. 60/280,594, filed on Mar. 30, 2001.

(51) Int. Cl.
*G06F 11/30* (2006.01)

(52) U.S. Cl. .................................. 726/24; 713/188

(58) Field of Classification Search ................ None
See application file for complete search history.

(56) References Cited

U.S. PATENT DOCUMENTS

| | | | | |
|---|---|---|---|---|
| 6,035,423 A | * | 3/2000 | Hodges et al. | 714/38 |
| 6,088,804 A | * | 7/2000 | Hill et al. | 726/25 |
| 6,123,737 A | * | 9/2000 | Sadowsky | 717/173 |
| 6,279,113 B1 | | 8/2001 | Vaidya | 713/201 |
| 6,393,424 B1 | * | 5/2002 | Hallman et al. | 707/10 |

OTHER PUBLICATIONS

RCMP, "Security Information Publication 5: Guide to Threat Risk Assessment For Information Technology", Nov. 1994, pp. 1-24.*

* cited by examiner

*Primary Examiner*—Emmanuel L Moise
*Assistant Examiner*—Jeffrey D Popham
(74) *Attorney, Agent, or Firm*—Zilka-Kotab, PC; Christopher J. Hamaty

(57) ABSTRACT

Methods and apparatus for predicting the incidence of a new virus a within a system based upon previous infections recorded within the system. According to one aspect of the present invention, a method for responding to a virus alert that provides information pertaining to a new virus includes obtaining the virus alert and assessing a risk level associated with the new virus. The risk level indicates the predicted likelihood that the first virus will cause significant damage in the event that the new virus infects the computer system. Finally, the method includes obtaining computer code such as a driver and/or a dat when the risk level indicates that the new virus may pose a significant risk to the computer system.

12 Claims, 8 Drawing Sheets

VIRUS PREDICTION SYSTEM AND METHOD

CROSS REFERENCE TO RELATED APPLICATION

The present invention is a continuation of an application filed Jul. 26, 2001 under Ser. No. 09/916,969 now U.S. Pat. No. 7,010,696 which, in turn, claims priority under 35 U.S.C. 119 of U.S. Provisional Patent Application No. 60/280,594, filed Mar. 30, 2001, which are each incorporated herein by reference in their entirety.

BACKGROUND OF THE INVENTION

1. Field of Invention

The present invention relates generally to virus protection systems. More particularly, the present invention relates to a virus incidence predictor that enables the susceptibility of an organization to new viruses to be assessed.

2. Description of the Related Art

As the use of networked computing systems increases, the risk of propagating viruses though networks also increases. While some viruses cause relatively minor problems within a computing system, many viruses may cause serious and even irreparable harm. As new viruses are being announced and identified daily, preparing computing systems to combat the viruses and to neutralize the effect of the viruses is essential in maintaining the integrity of the network.

Drivers and/or dats which provide software that may prevent an infection or combat an existing infection are generally created to operate with anti-virus software on a system to neutralize the effect of a virus on the system. Typically, drivers and/or dats are created to effectively combat certain viruses. That is, once a virus is announced, drivers and/or dats which are intended to serve as fixes or patches for the virus are developed. Once developed, the drivers and/or dats may then be provided to anti-virus software on a system to neutralize the effect of the virus on the system.

FIG. 1a is a process flow diagram which illustrates the steps associated with a method of combating viruses. A process 100 begins at step 102 in which a system, e.g., a computing system, operates. During the operation of the system, a determination is made in step 104 as to whether a virus has been detected within the system. In other words, it is determined if a virus has breached the security of the system. If it is determined that a virus is not detected within the system, then a determination is made in step 110 as to whether a specified time length has elapsed. The specified time length is a duration of time which passes before drivers and/or dats on the system are updated, e.g., by downloading current drivers and/or dats onto the system.

If it is determined that the specified time length has not elapsed, then the system continues to operate at step 102. Alternatively, if it is determined that the specified time length has elapsed, then drivers and/or dats are downloaded from an anti-virus website in step 112. Typically, all new and updated drivers and/or dats are downloaded. Once the drivers and/or dats are downloaded, the downloaded drivers and/or dats are applied, e.g., by anti-virus software that is local to the system, the system continues to operate at step 102.

Returning to step 104 and the determination of whether a virus is detected within the system, if it is determined that no virus has been detected within the system, process flow proceeds to step 110 in which it is determined whether a specified time length has elapsed. That is, since drivers and/or dats are periodically downloaded onto the system, it is determined in step 110 whether it is time for another download to occur.

As shown in FIG. 1b, local anti-virus or anti-viral software 130 which is suitable for downloading and applying drivers and/or dats is often included in a system 134. Local anti-viral software 130 accesses drivers and/or dats 138 which are external to system 134 to download drivers and/or dats 138. As discussed above, drivers and/or dats 138 may be downloaded periodically by local anti-viral software 130. Alternatively, drivers and/or dats 138 may be downloaded when a virus is detected within system 134.

In order to prevent viruses from penetrating a system, a network administrator may choose to download drivers and/or dats relatively often. Such downloading may be performed by reducing the time intervals between consecutive scheduled downloads to enable downloads to be performed more often. By downloading drivers and/or dats more often, the likelihood that a new virus may affect the system before an appropriate driver and/or dat is obtained may be reduced. However, frequently downloading substantially all new or updated drivers and/or dats, and implementing the new or updated drivers and/or dats, may be inefficient.

Anti-virus companies or organizations, through the use of electronic mail and websites, may provide warnings pertaining to new viruses. A system or network administrator may generally monitor the warnings to ascertain which viruses pose significant threats to the system he administers. With the large amount of viruses currently being developed, ascertaining which virus threats to take seriously and which virus threats may effectively be ignored for the time being may be a nearly impossible task for the network administrator. Reacting to virus threats substantially immediately after the virus threats are announced may be time-consuming and, hence, inefficient especially if the viruses fail to seriously threaten the system. However, failing to react to the virus threats substantially immediately after the virus threats are announced may result in a virus infecting the system before appropriate dats and/or drivers are applied.

Relying substantially on only information provided in virus alerts to assess the risk posed by viruses may not be sufficient, as some viruses characterized as being relatively "minor" may actually cause significant problems in specific types of networks. That is, a virus that may pose only a minor threat to one system may pose a substantial threat to another system.

Therefore, what is needed is an efficient method and apparatus for assessing the risk of a virus to a particular system. That is, what is desired is a method and an apparatus that analyzes the types of infections that a system or organization has had in the past, and warns a network administrator of new viruses which are similar to viruses that have previously caused significant infections within the system.

SUMMARY OF THE INVENTION

Methods and apparatus for predicting the incidence of a new virus a within a system based upon previous infections recorded within the system. According to one aspect of the present invention, a method for responding to a virus alert that provides information pertaining to a new virus includes obtaining the virus alert and assessing a risk level associated with the new virus. The risk level indicates the predicted likelihood that the first virus will cause significant damage in the event that the new virus infects the computer system. Finally, the method includes obtaining computer code such as a driver and/or a dat when the risk level indicates that the new virus may pose a significant risk to the computer system.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Ascertaining which virus threats are to be taken seriously and which virus threats may effectively be ignored in the short term may be a nearly impossible task for a network administrator, given the volume of new viruses that are being developed. Reacting to all virus threats substantially immediately after the virus threats are announced often proves to be inefficient. On the other hand, failing to react to the virus threats substantially immediately may result in a virus infecting a system. While a network administrator may choose to react to virus alerts associated with viruses which are believed to pose great threats to systems in general, the network administrator may need to react substantially immediately to viruses that are believed to pose lesser threats, as such viruses may be particularly damaging to the system administered by the network administrator. In general, it is difficult for the network administrator to determine which of the viruses that are believed to pose lesser threats to respond to.

Recording information pertaining to viruses which have previously infected a system, i.e., tracking and trending viruses which have previously infected a system, then comparing a new virus described in a virus alert against the recorded information allows the risk of the new virus to be assessed with respect to the system. A system which includes a virus incidence predictor generally enables viruses which are likely to pose a threat within the system to effectively be predicted and, hence, enables a network administrator to adequately prepare to combat the virus. By identifying viruses which the system is susceptible to based upon viruses which have previously infected the system, a network administrator may predict which viruses the system is likely to encounter.

If a comparison of the new virus to previous viruses within the system results in a low predicted likelihood that the new virus will affect the system, then it may not be necessary to substantially immediately deal with the new virus, e.g., by substantially immediately obtaining appropriate drivers and/or dats. Alternatively, if a comparison of the new virus to previous viruses within the system results in a relatively high predicted likelihood that the new virus will significantly affect the system, then a network administrator may react to the threat of the new virus appropriately.

The use of a system which includes both a virus incidence predictor and anti-viral software enables the threat of viruses to be dealt with in an efficient manner. Such a system allows the anti-viral software to periodically download drivers and/or dats from an anti-virus website, while allowing the virus incidence predictor to download specific drivers and/or dats on an as-needed basis based upon the predicted probability that a given virus will affect the system. Hence, such a system is both effective and efficient in dealing with viruses.

Figure 1A:
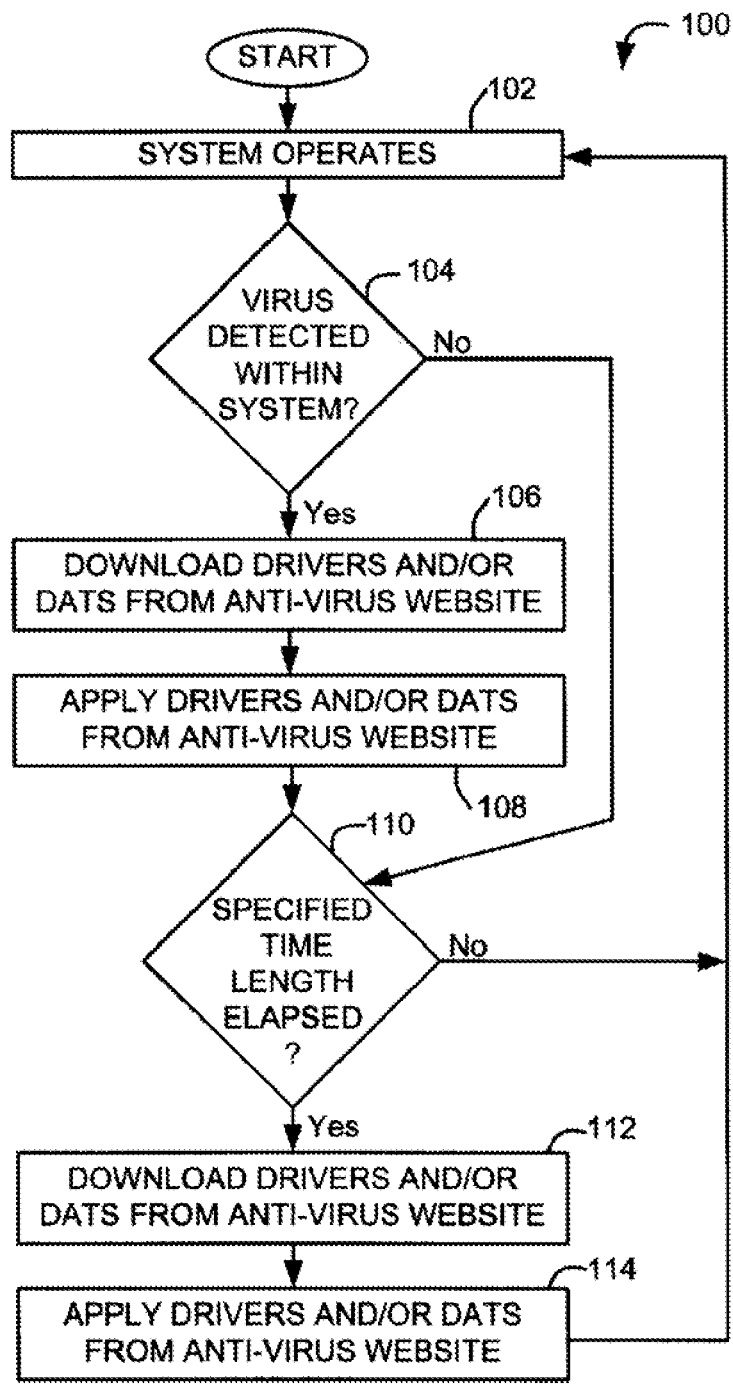
FIG. 1a is a process flow diagram which illustrates the steps associated with a conventional method of combating a virus in a computer system.
Figure 1B:
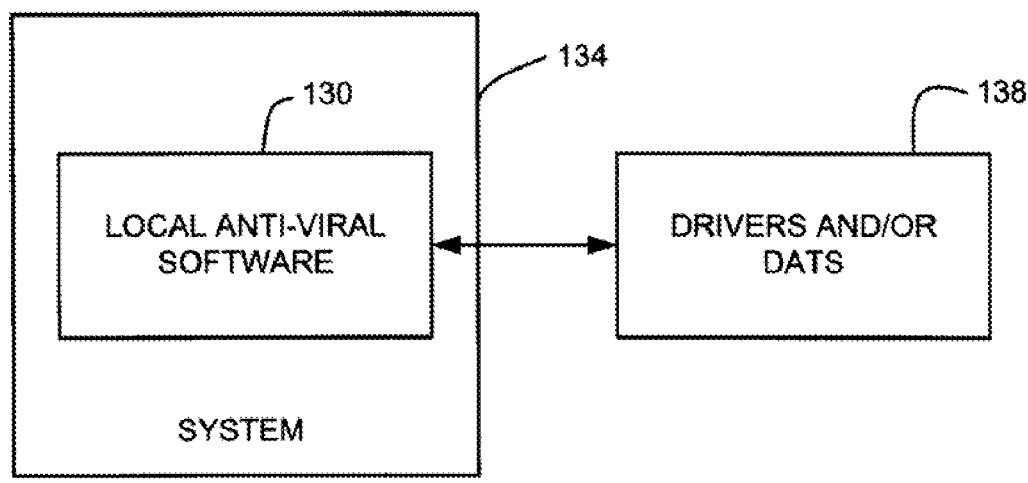
FIG. 1b is a schematic of a system which includes anti-viral software.
Figure 2:
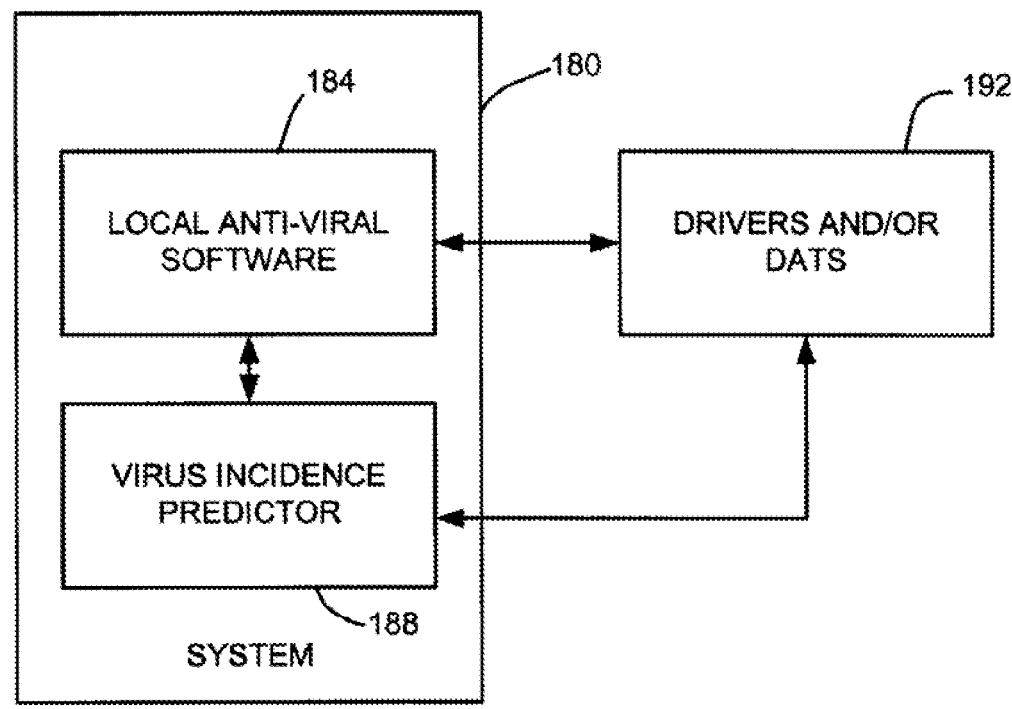
FIG. 2 is a schematic of a system which includes anti-viral software and a virus incidence predictor in accordance with an embodiment of the present invention.

With reference to FIG. 2, a system which includes local anti-viral software and a virus incidence predictor will be described in accordance with an embodiment of the present invention. A system 180, e.g., a local network, includes local anti-viral or anti-virus software 184 and a virus incidence predictor 188 which are both in communication with external drivers and/or dats 192 which they may each download or otherwise obtain. Local anti-viral software 184 downloads drivers and/or dats 192 at predetermined intervals, while virus incidence predictor 188 causes drivers and/or dats 192 to be downloaded when it predicts that a particular new virus is likely to be encountered by system 180. When virus incidence predictor 188 causes drivers and/or dats 192 to be downloaded, virus incidence predictor 188 also generally causes local anti-virus software 184 to apply the downloaded drivers and/or dats 192.

Figure 3:
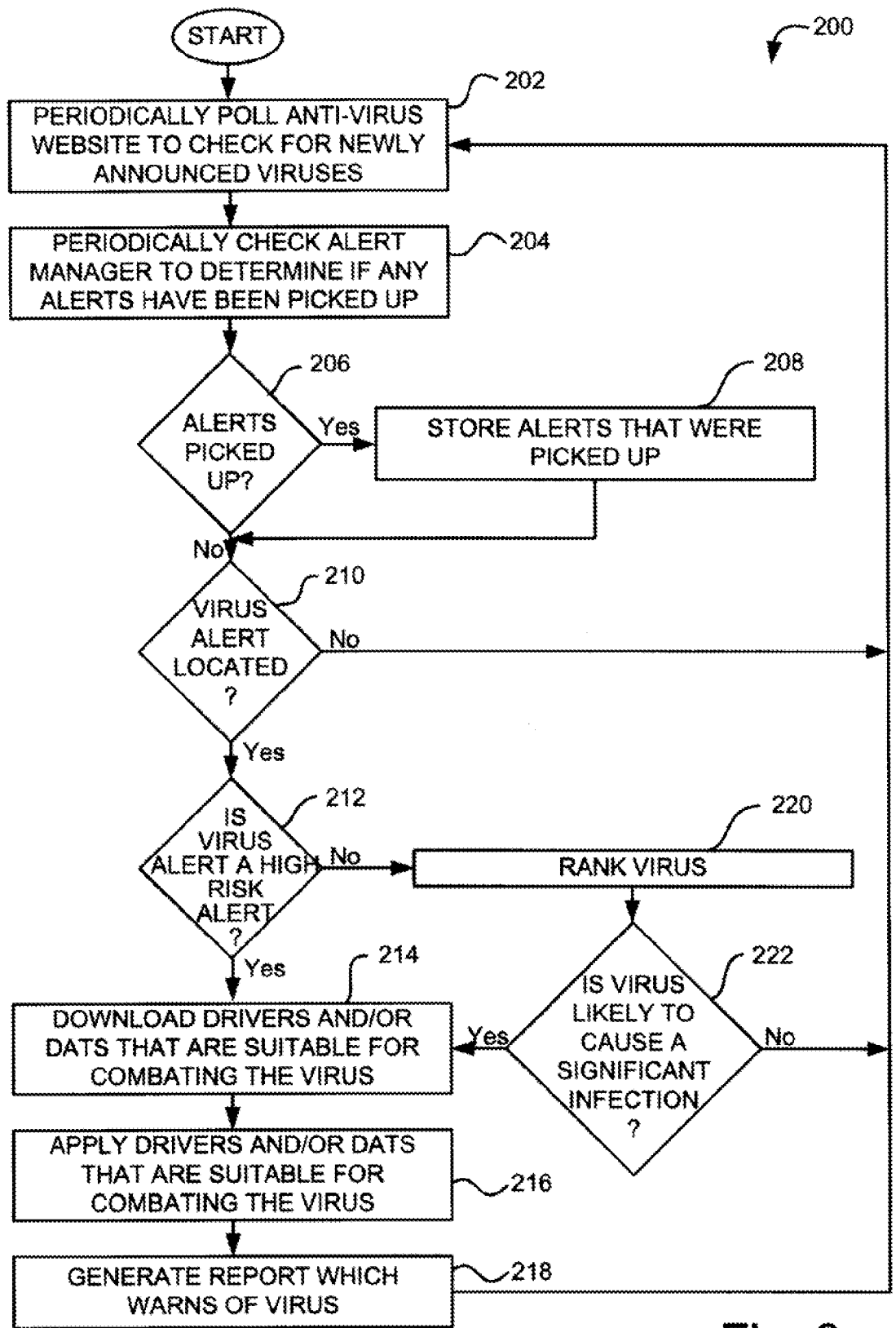
FIG. 3 is a process flow diagram which illustrates the steps associated with a first method of predicting the incidence of a virus in accordance with an embodiment of the present invention.

Predicting the incidence of a virus within a system generally includes monitoring new viruses such that substantially any new virus which may significantly harm the system may be identified in a relatively time-efficient manner. FIG. 3 is a process flow diagram which illustrates the steps associated with a process of predicting the incidence of a virus in accordance with an embodiment of the present invention. A process 200 begins at step 202 in which, during the operation of an overall system, a server on which a virus incidence predictor executes periodically polls an anti-virus website to check for newly announced viruses. By way of example, the virus incidence predictor itself may automatically poll an anti-virus website at predetermined time intervals to check for virus definitions which have been produced since the last time the virus incidence predictor polled the anti-virus website. Although the predetermined time intervals may vary, e.g., the time intervals may be adjusted by a network administrator, the time intervals are typically on the order of approximately one day. That is, the anti-viral website that is accessible to the overall system may be polled once a day.

When a new virus, or a virus which has not been detected before, is identified, an anti-virus website generally produces a virus alert. The virus alert includes information associated with the new virus. Such information may include, but is not limited to, a description of the virus, dats associated with the virus, and information relating to the perceived risk associated with the virus.

Figure 7:
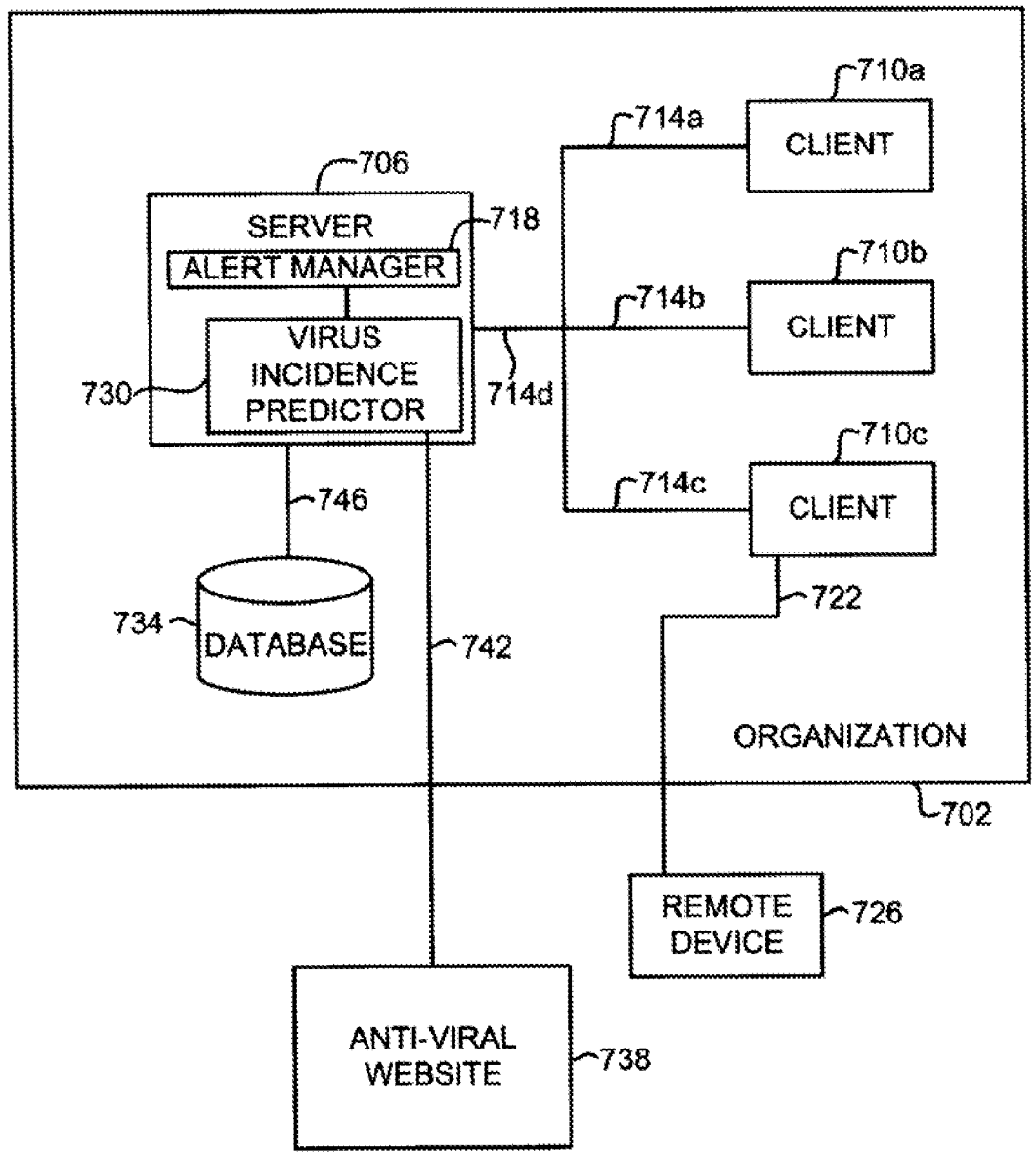
FIG. 7 is a schematic of a networked organization which includes a virus incidence predictor in accordance with an embodiment of the present invention.

In addition to periodically polling an anti-virus website or an anti-virus information source, as for example an anti-virus website maintained by Network Associates Technology, Inc., of Santa Clara, Calif. at http://www.NAI.com, an alert manager application (as shown below with respect to FIG. 7) which also executes on the server is periodically checked or polled in step 204 to determine if the alert manager application has picked up any alerts. In other words, the alert manager application which monitors alerts is periodically polled, e.g., more than once a day or approximately twice a week, to determine if any alerts have been received by the server since the last time the alert manager application was polled. As will be appreciated by those skilled in the art, a client associated with the server may notify the alert manager application of an alert. When an alert is received by the alert manager application, the indication is that a virus which corresponds to the alert has been detected within the overall system by anti-viral software that is local to the overall system which effectively operates in parallel with the virus incidence predictor. The alert manager application may be an application such as Alert Manager or EPO, available from Network Associates Technology, Inc.

A determination is made in step 206 regarding whether an alert or alerts have been picked up by the alert manager application. If it is determined that at least one alert has been identified by the alert manager application, then process flow proceeds to step 208 in which the alerts that were picked up are stored in a database. Once the alerts are stored, process flow proceeds to step 210 in which a determination is made as to whether a virus alert was located when the anti-virus website was polled. In step 206, if the determination is that no alerts were picked up by the alert manager application, process flow proceeds directly from step 206 to step 210.

If it is determined in step 210 that a virus alert was not located when the anti-virus website was polled, then process flow returns to step 202 in which the overall system continues to operate, and the anti-virus website is periodically polled to check for newly announced viruses. Alternatively, if it is determined that a virus alert was located, then it is determined in step 212 whether the virus alert is a high risk alert. Typically, determining whether the alert is a high risk alert involves reading information in the virus alert that pertains to the perceived risk level of the virus alert. While the factors used in the characterization of a virus as a high risk virus may vary, a virus that is associated with a high risk alert is generally a virus that is observed to have infected a relatively large geographic area in a relatively short period of time. For example, a virus that is characterized as a high risk virus may be a virus that has been seen to spread across North America in less than two days.

When the determination in step 212 is that the virus alert is a high risk alert, the indication is that it would be beneficial to prepare the overall system to handle the virus identified by the virus alert. Accordingly, the drivers and/or dats that are suitable for combating the virus are downloaded from the anti-viral website in step 214. The downloaded drivers and/or dats may then be applied in step 216 by anti-viral software that is local to the overall system. Local anti-viral software, which runs in parallel with the virus incidence predictor, includes, but is not limited to, VirusScan, GroupShield, and WebShield software packages available from McAfee.com of Sunnyvale, Calif.

After the drivers and/or dats are applied or effectively installed by local anti-viral software, a report which warns of the virus is generated in step 218. Generally, in order to generate a report, the virus incidence predictor notifies the alert manager that new drivers and/or dats have been applied. The alert manager application then provides a report to a network administrator, e.g., via electronic mail or a pager, to warn the network administrator of the virus so that the network administrator may implement appropriate measures. In one embodiment, the network administrator may notify substantially all clients within the overall system that a virus which is likely to cause a significant infection may permeate the overall system. It should be appreciated that the alert manager application may also substantially directly notify clients within the overall system of the existence of the virus which may potentially affect the overall system. Once the report which warns of the virus is generated in step 218, process flow returns to step 202 in which the overall system operates, and the anti-virus website is periodically polled to check for newly announced viruses.

Figure 4:
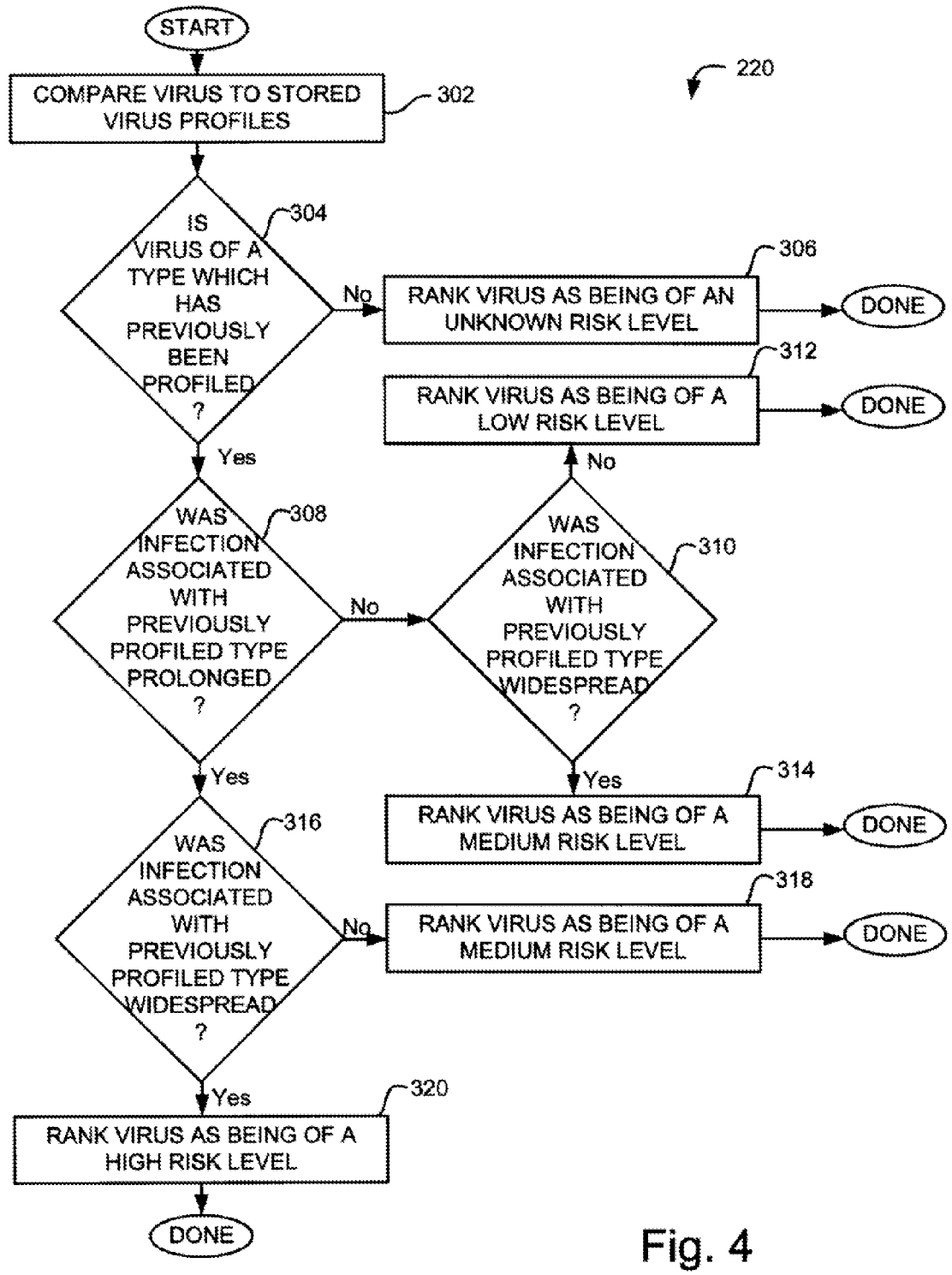
FIG. 4 is a process flow diagram which illustrates the steps associated with ranking a virus in accordance with an embodiment of the present invention.

Returning to step 212, if the determination is that the virus alert is not a high risk alert, then in step 220, the risk of the virus is determined with respect to the overall system. That is, the rank of the virus is determined with respect to the overall system. Ranking the virus generally includes assessing the risk of the virus to the overall system, irregardless to the risk identified in the virus alert itself, as will be described below with respect to FIG. 4. Once the virus is ranked, a determination is made in step 222 as to whether the virus is likely to cause a significant infection within the overall system. If it is determined that the virus is not likely to cause a significant infection, then process flow returns to step 202 in which the anti-viral website is periodically polled to check for newly announced viruses. Alternatively, if it is determined that the virus is likely to cause a significant infection, the drivers and/or dats which are suitable for combating the virus are downloaded from the anti-viral website in step 214.

It should be appreciated that the characterization of whether a virus is likely to cause a significant infection may vary. A virus which is identified as being of a high risk level is generally characterized as being likely to cause a significant infection. Typically, a virus which is of an unknown risk level is considered as being likely to cause a significant infection, as precautions such as downloading drivers and/or dats associated with a virus of an unknown risk level may prevent an infection in the event that the unknown risk level is actually a high risk level with respect to the overall system. In other words, since it is not known whether a virus of an unknown risk level may pose a significant risk to the overall system, such a virus is generally treated as effectively having a high risk level.

As mentioned above, when a virus is not characterized as being high risk in a virus alert that identifies the virus, then the risk or the risk level of the virus with respect to the overall system is characterized. The characterization, which is based at least in part upon the types of viruses which have previously affected the overall system, may then be used to determine whether the drivers and/or dats for the virus are to be substantially immediately downloaded by a virus incidence predictor. With respect to FIG. 4, the steps associated with ranking a virus for which an alert is received, i.e., step 220 of FIG. 2, will be described in accordance with an embodiment of the present invention. A process of ranking a virus 220 begins at step 302 in which the virus, i.e., the "current" virus or the virus for which an alert was received, is compared to the stored virus profiles. The stored virus profiles are virus profiles for substantially all viruses which have been picked up by clients or machines within the overall system. In one embodiment, the stored virus profiles are associated with virus alerts received by the alert manager application from the clients of the overall system when viruses are picked up by the clients. Such virus profiles are generally stored in a database which is accessible to the virus incidence predictor Comparing the current virus to the stored virus profiles causes the virus profiles to be tracked and trended. Trending the virus profiles studies infection rates, the length the overall system has been affected by the profiled viruses, and how widespread the infections associated with the profiled viruses are. The current virus is compared against the virus profiles to effectively assess the probable magnitude of an infection caused by the current virus if the current virus infects the overall system.

After the current virus is compared to the stored virus profiles, a determination is made in step 304 as to whether the current virus is of a type that has previously been profiled. If it is determined that the current virus is not of a type that has previously been profiled, then the current virus is ranked in step 306 as being of an unknown risk level. Once the current virus is ranked as being of an unknown risk level, the process of ranking the virus is completed.

Alternatively, if it is determined in step 304 that the virus is of a type which has previously been profiled, then a determination is made in step 308 as to whether the infection associated with a previous virus of the same type as the current virus was prolonged. The duration of an infection that is considered prolonged may vary due, at least in part, to the specifications implemented by a network administrator. By way of example, an infection may be considered to be prolonged if the infection lasts for more than a week. Alternatively, an infection may be considered to be prolonged if the infection lasts for more than a day.

If it is determined that the infection associated with the previous virus was not prolonged, a determination is made in step 310 regarding whether the infection associated with the previous virus of the same type as the current virus was widespread. In general, the classification of a previous virus as being widespread may be based upon the percentage of machines within the overall system which were infected by the previous virus. The percentage may vary depending upon specifications associated with the overall system. When it is determined that the infection associated with the previously profiled virus was not widespread, then the indication is that the current virus is likely to be neither prolonged nor widespread. As such, the current virus is characterized or ranked as being of a low risk level in step 312. In one embodiment, a virus characterized as being of a low risk level is considered to be relatively unlikely to cause a significant infection within the overall system. Once the current virus is ranked, the process of ranking the virus is completed. On the other hand, if the determination in step 310 is that the infection associated with the previous virus was widespread, then the current virus is ranked as being of a medium risk level in step 314, and the process of ranking the current virus is completed.

Returning to step 308, if it is determined that the infection associated with the previous virus was prolonged, then process flow proceeds to step 316 in which it is determined if the infection associated with the previous virus was also widespread, in addition to being prolonged. If it is determined that the infection associated with the previous virus was not widespread, then the current virus is ranked in step 318 as being of a medium risk level, and the process of ranking the current virus is completed. Alternatively, if it is determined that the infection associated with the previous virus was both prolonged and widespread, then process flow moves from step 316 to step 320 in which the current virus is ranked as being of a high risk level. That is, the current virus is characterized as being relatively likely to cause a significant infection within the overall system. After the current virus is ranked as being of a high risk level in step 320, the process of ranking the virus is completed.

In order for a virus to be compared against existing virus profiles, when a virus is picked up by the overall system, i.e., when a virus infects or is detected within the overall system, the virus is characterized. The virus may be characterized by a virus incidence predictor, or by an application which is in communication with the virus incidence predictor. In the described embodiment, the virus is characterized by the virus incidence predictor which looks a the name of the virus, and also determines how long the virus has been causing an infection and how widespread the virus is by studying alerts from an alert manager. While such a characterization may occur substantially immediately after the virus has been eradicated from the overall system, it should be understood that such a characterization may instead occur at substantially fixed times, e.g., two times a week.

Figure 5:
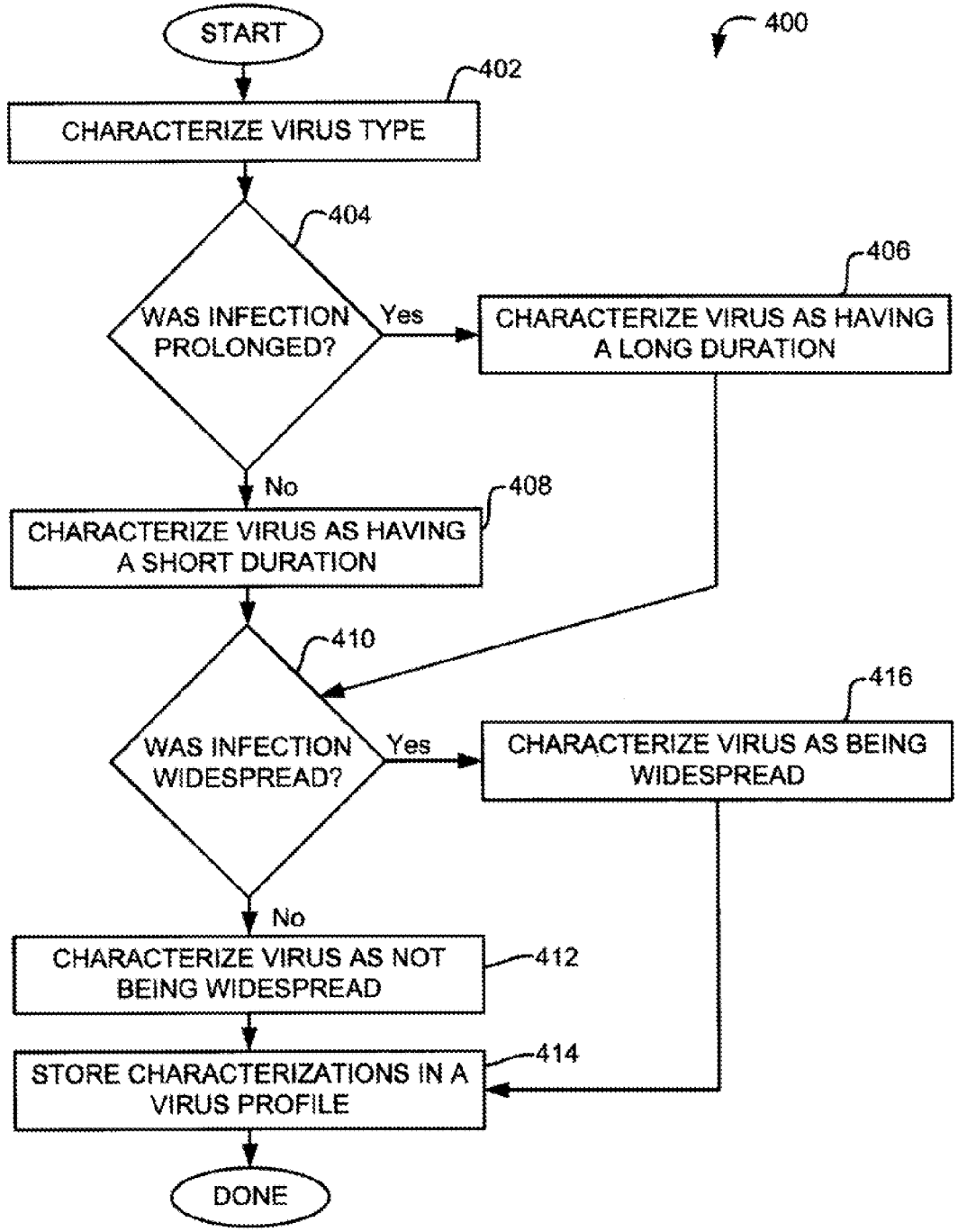
FIG. 5 is a process flow diagram which illustrates the steps associated with characterizing a virus which has been detected within a system in accordance with an embodiment of the present invention.

FIG. 5 is a process flow diagram which illustrates the steps associated with one method of characterizing a virus which has been detected on an overall system in accordance with an embodiment of the present invention. A process 400 of characterizing a virus begins at step 402 in which the virus type is characterized, i.e., the type associated with the current virus is characterized. Typically, characterizing a virus type includes searching a table of virus types that is maintained within or by the virus incidence predictor. Such a table may be arranged to identify which virus types have the tendency to cause the most problems within the overall system.

Virus types that are identified in a list of viruses include, but are not limited to, mass mailer viruses, "Windows" viruses, word processor viruses, macro viruses, and script viruses. Mass mailer viruses infect a computer and automatically send electronic mail to substantially everyone included in an address list in a mailing program on the computer, while Windows viruses affect executable files installed on the computer using a Microsoft Windows package available from Microsoft Incorporated of Redmond, Wash. Word processor viruses affect files associated with a word processor, macro viruses affect macro files in spreadsheet applications such as Microsoft Excel which is available from Microsoft Incorporated, and script viruses affect script files.

An alert manager provides a type associated with the current virus by studying the name of the current virus. As will be appreciated by those skilled in the art, the name of a virus typically includes an indication of the virus type. By way of example, if a virus is a mass mailer type virus, the name of the virus generally includes an "@mm" extension.

After the virus type is characterized in step 402, a determination is made regarding whether an infection by a virus or viruses of the same type as the virus being characterized, or the characterized virus type, was prolonged. For example, if the current virus that is being characterized is a mass mailer type virus, then it is determined whether an infection caused by both the current virus and previous mass mailer type viruses is prolonged. Such a determination is generally made by studying the database in which virus profiles are stored to identify the date and the time of the first instance of the characterized virus type within the overall system, as well as the date and the time of the last instance of the characterized virus type within the overall system. The last instance of the characterized virus type is typically the instance of the current virus.

The criteria used to determine if an infection is considered as being prolonged may vary widely. For instance, a length of time a virus infected a least a part of the overall system may be considered as prolonged if it exceeds the length of all other infections that affected at least a part of the overall system.

Alternatively, a particular length of time may be used to define a prolonged infection, e.g., a duration of two days or a duration of one week may be considered to effectively define a prolonged infection.

If it is determined that the infection by viruses of the characterized virus type was prolonged, then the current virus is characterized as having a long duration in step 406. Alternatively, if it is determined that the infection was not prolonged, then the current virus is characterized as having a short duration, or not having a long duration, in step 408. Although substantially only a long duration and a short duration are considered in the described embodiment, it should be understood that in other embodiments, intermediate durations such as a medium duration may also be considered in addition to a long duration and a short duration.

From steps 406 and 408, process flow moves to step 416 in which a determination is made regarding whether the infection caused by the current virus was widespread or had a relatively significant scope. That is, it is determined whether the infection is considered to have infected a significant portion of the overall system. The criteria used to characterize an infection as widespread or having a significant scope may generally vary. For example, the infection may be considered to be widespread if a larger percentage of the overall system was infected than was previously infected by other viruses. Alternatively, the infection may be considered to be widespread if more than a particular percentage, e.g., more than fifty percent, of the overall system was infected by the current virus.

If it is determined in step 410 that the infection attributed to the current virus was widespread, the current virus is characterized as being widespread in step 416. On the other hand, if the infection caused by the current virus is not determined to have been widespread, then the current virus is characterized as not being widespread in step 412. Once the infection is either characterized as being widespread in step 416 or as not being widespread in step 412, the characterizations of the current virus are stored in a virus profile in step 414. That is, the characterized type associated with the current virus, the characterized duration of the current virus, and the characterized infectious scope of the current virus are placed into a profile that is stored on a database that is accessible to the virus incidence predictor. After the profile is created and stored, the process of characterizing a virus that has affected an overall system is completed.

Figure 6:
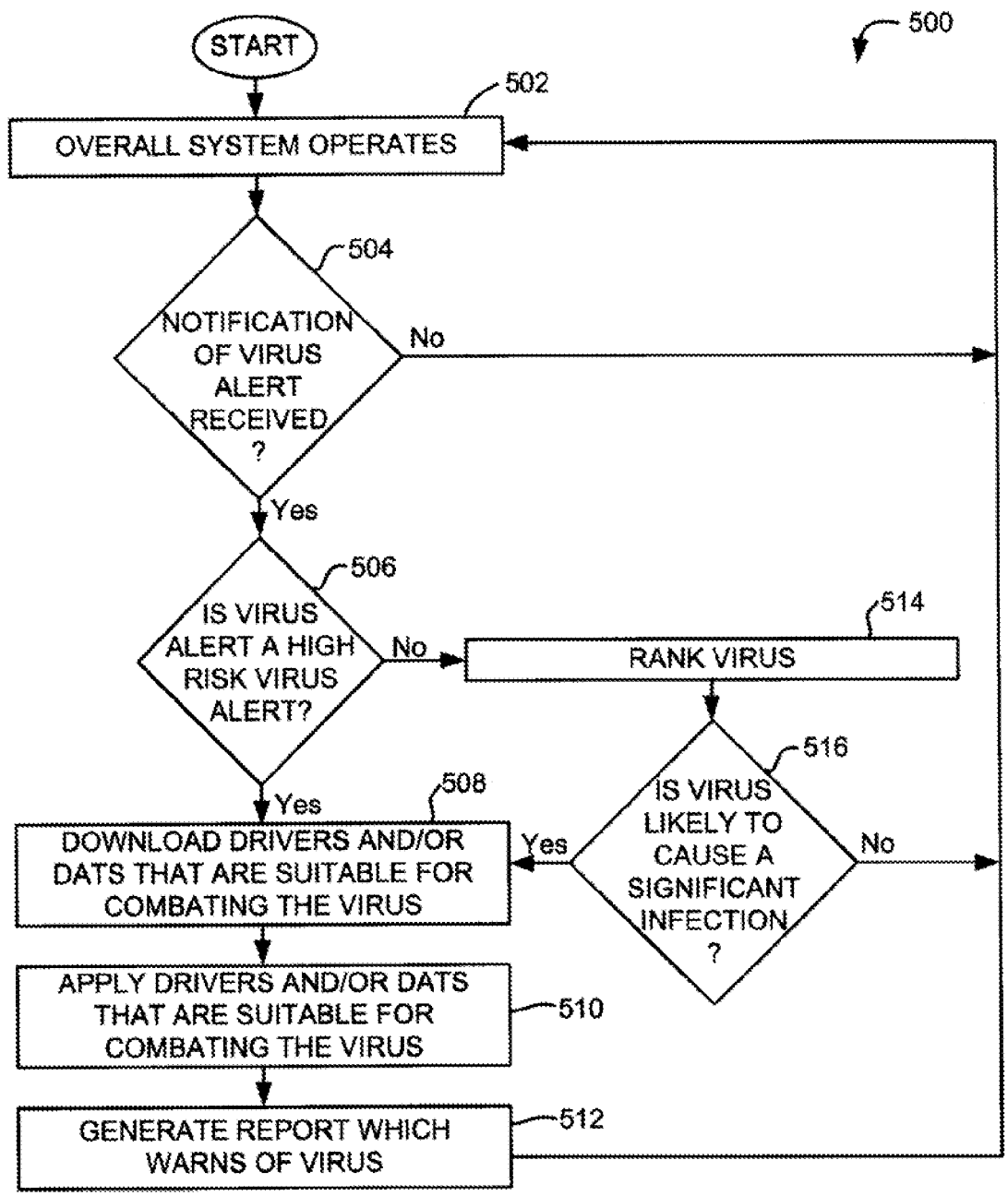
FIG. 6 is a process flow diagram which illustrates the steps associated with a second method of predicting the incidence of a virus in accordance with another embodiment of the present invention.

While a virus incidence predictor may periodically poll an anti-virus website to check for newly announced viruses, as discussed above with respect to FIG. 3, a virus incidence predictor may instead be notified by an anti-viral website when newly announced viruses are identified. For example, a notification of a virus alert may be sent from the anti-virus website to the virus incidence predictor. FIG. 6 is a process flow diagram which illustrates the steps associated with a method of predicting the incidence of a virus which involves receiving notifications from an anti-viral website in accordance with a second embodiment of the present invention. A process 500 begins at step 502 in which an overall system operates. In the described embodiment, the operation of the overall system includes automatically periodically checking an alert manager to determine if any alerts have been picked up by the overall system, as well as allowing an anti-virus system associated with the overall system to periodically download drivers and/or dats from an anti-virus website.

A determination is made in step 504 as to whether a notification of a virus alert has been received while the overall system operates. That is, it is determined if the virus incidence predictor has received a notification from an anti-viral website that at least one new virus has been announced. If it is determined that a notification of a virus alert has not been received, then process flow returns to step 502 in which the overall system continues to operate. Alternatively, if it is determined that a notification was received, then a determination is made in step 506 as to whether the virus alert associated with the notification is a high risk virus alert.

When the determination in step 506 is that the virus alert is a high risk alert, the drivers and/or dats that are suitable for combating the virus are downloaded from the anti-viral website in step 508. The downloaded drivers and/or dats may then be applied in step 510 by anti-viral software that is local to the overall system. Once the drivers and/or dats are applied, a report which warns of the virus is generated in step 512. After the report which warns of the virus is generated in step 512, process flow returns to step 502 in which the overall system continues to operate.

Returning to step 506, if the determination is that the virus alert is not a high risk alert, the risk of the virus to the overall system is determined in step 514. That is, the rank of the virus is determined with respect to the overall system. Ranking the virus generally includes assessing the susceptibility of the overall system to infection by the virus, as was described above with respect to irregardless to the risk identified in the virus alert itself, as was described above with respect to FIG. 4. After the virus is ranked, a determination is made in step 516 as to whether the virus is likely to cause a significant infection within the overall system. If it is determined that the virus is not likely to cause a significant infection, then process flow returns to step 502 in which the overall system continues to operate. Alternatively, if it is determined that the virus is likely to cause a significant infection, the drivers and/or dats which are suitable for combating the virus are downloaded from the anti-viral website in step 508. It should be appreciated that if it is determined that the virus is not likely to cause a significant infection, the drivers and/or dats which are suitable for combating the virus may be downloaded at a later time by anti-virus software.

As mentioned above, a virus incidence predictor may be implemented within an overall system or organization, e.g., a system which includes a client and a server which are networked. One suitable system which includes a virus incidence predictor will be described with reference to FIG. 7 in accordance with an embodiment of the present invention. An organization 702, e.g., a system, generally includes a server 706 and clients 710. Server 706 and clients 710 may generally be part of an intranet, and may each be general purpose computing devices. One example of a general purpose computing device will be described below with respect to FIG. 8.

Clients 710 communicate with server 706 across communications links 714. By way of example, if a virus is detected on client 710*a*, client 710*a* may send an alert through links 714*a*, 714*d* to server 706 or, more specifically, an alert manager 718 on server 706. In one embodiment, client 710*c* is in communication with a remote device 726, e.g., a computing device that is external to organization 702, across a communications link 722.

Server 706 is configured to include alert manager 718 and a virus incidence predictor 730. Virus incidence predictor 730 is generally in communication across a communications link 742 with an anti-viral website 738 which, as shown, is external to organization 702. Virus incidence predictor 730 may either periodically poll anti-viral website 738 to determine when newly announced viruses have been added to anti-viral website 738, or await notification from anti-viral website 738 relating to newly announced viruses. A database 734 which stores virus profiles is accessible to virus incidence predictor 730 across a communications link 746. In general, virus incidence predictor 730 updates information stored on database 734.

Figure 8:
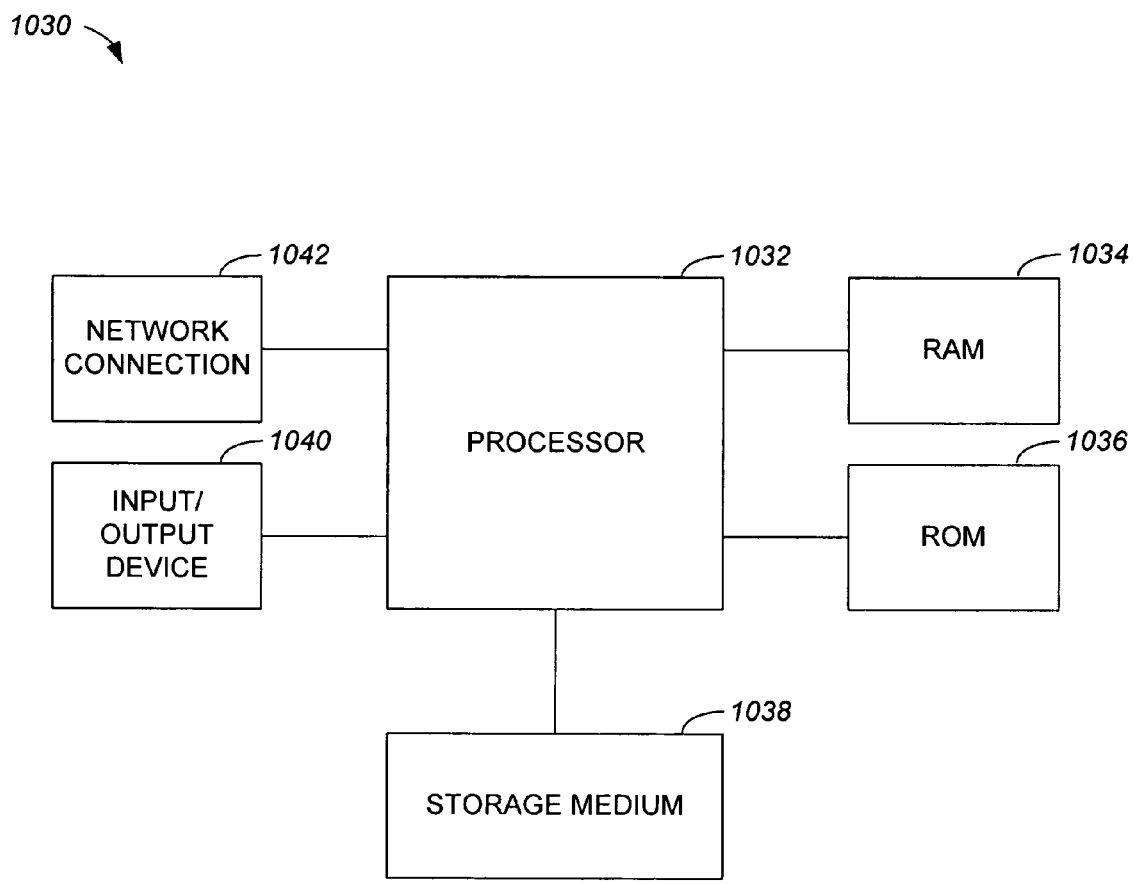
FIG. 8 is a block diagram of a computing device which is suitable for implementing the present invention.

The present invention may be implemented within a system with which may include substantially any suitable computing device. By way of example, the present invention may generally be implemented within an overall computing network which includes a plurality of computing devices. FIG. 8 illustrates a typical, general purpose computing device or individual computer system suitable for implementing the present invention. A computing device or individual computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1034 as virtual memory. A specific primary storage device 1036 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, ranking a virus when a virus alert is received has been described as including a determination of whether a previous infection associated with a similar virus was prolonged and a determination of whether the previous infection was widespread within a system. In general, it should be understood that ranking a virus may include additional, or different, determinations. Other determinations include, but are not limited to, whether the previous infection effectively incapacitated the system and whether the ease with which the previous infection was eradicated.

Local anti-virus software has been described as running substantially in parallel with a virus incidence predictor. However, it should be appreciated that local anti-virus software may not necessarily run in parallel with the virus incidence predictor. In addition, the anti-virus software may not be on the same computer, e.g., server, as the virus incidence predictor. Instead, the anti-virus software may be present on a different computer within the same network as the virus incidence predictor.

While the present invention has been described as either polling one anti-viral or anti-virus website or receiving notification from one anti-viral website, more than one anti-virus website or mailing list may effectively be monitored to determine if there are newly announced viruses. For example, an anti-virus website maintained by Network Associates Technology, Inc. may be polled by a virus incidence predictor, while the virus incidence predictor monitors mailing lists including CVE, which is maintained by MITRE Corporation of McLean, Va., and SANS, which is maintained by SANS Institute of Bethesda, Md.

In general, the steps associated with methods of predicting the incidence of a virus, and of ranking the risk level of a virus, may be widely varied. Steps may be added, removed, altered, or reordered without departing from the spirit or the scope of the present invention. For example, in one embodiment, although the steps associated with predicting the incidence of a virus have been described in terms of addressing a single virus alert, the steps may be altered to address more than a single virus alert when more than one virus alert is received. In addition, the steps associated with polling an alert manager may be eliminated for an embodiment in which an alert manager is not used.

When a virus that has infected a system is characterized, a determination of whether the infection was prolonged is made. As described above, such a determination may include identifying the first instance of a similar virus and a last instance of a similar virus. In one embodiment, the determination may include establishing the duration of the recent infection of substantially only the actual virus that is being characterized.

The characterization of whether an infection was prolonged has been described as either causing the characterization of the infection as being long in duration or causing the characterization of the infection as being short in duration. In lieu of characterizing infections as either long in duration or short in duration, infections may also be characterized as having a medium or "average" duration. That is, the duration of an infection may be characterized as having one of any number of durations. Similarly, instead of either characterizing an infection as being widespread or characterizing the infection as not being widespread, an infection may be characterized as having a wide range, having a medium or average range, or having a short range.

The polling time intervals associated with polling an anti-virus website and checking an alert manager may vary depending upon the requirements of a particular system, e.g., as determined by a network administrator. For instance, polling time intervals may range from less than a day to more than a week. It should be appreciated that the polling time interval for the alert manager may vary from the polling time interval for the anti-virus website. That is, the alert manager and the anti-virus website may be polled at different time intervals.

While drivers and/or dats are described as being downloaded from a remote anti-virus website, the drivers and/or dats may instead be in the same overall system as a virus incidence predictor. That is, an anti-virus website and, hence, drivers and/or dats may be local to an overall system without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method, comprising:
   receiving a virus alert, the virus alert containing information pertaining to a new virus;
   assessing a risk level associated with the new virus, the risk level indicating a risk of damage caused by an infection of the new virus on a computer system; and
   obtaining a program code when the risk level indicates that the new virus may pose a risk of damage on the computer system, the program code being configured to combat the new virus;
   wherein assessing the risk level associated with the new virus includes:
      obtaining information associated with at least one previous virus which has caused a previous infection on the computer system; and
      comparing the information pertaining to the new virus with the information associated with the previous virus which has previously caused the previous infection on the computer system;
   wherein the previous virus and the new virus are of a first type, and the information associated with the previous virus which has caused the previous infection on the computer system includes data associated with at least one of a duration of the previous infection and a scope of the previous infection;
   wherein if the information associated with the previous virus indicates that the previous infection did not have a prolonged duration and was not widespread, the risk level includes a low risk level.

2. The method as recited in claim 1 wherein when the previous infection has at least one of the prolonged duration and a particular scope, the risk level indicates that the new virus may pose the risk of damage on the computer system.

3. The method as recited in claim 1 wherein the information associated with the previous virus which has caused the previous infection on the computer system is stored in a profile on a database associated with the computer system.

4. The method as recited in claim 1 wherein the virus alert is received from an anti-virus information source.

5. The method as recited in claim 4 wherein the virus alert is automatically received from the anti-virus information source.

6. The method as recited in claim 5 wherein receiving the virus alert includes acquiring the virus alert from the anti-virus information source.

7. The method as recited in claim 1 wherein the computer system is a computer network, the computer network including a plurality of computing devices.

8. A computer program product, comprising:
   computer code for receiving a virus alert, the virus alert containing information pertaining to a new virus;
   computer code for assessing a risk level associated with the new virus, the risk level indicating a risk of a new infection by the new virus on a computer system;
   computer code for obtaining program code when the risk level indicates that the new virus may pose a risk of the new infection on the computer system, the program code being configured to combat the new virus; and
   a computer-readable storage medium that stores the computer codes;
   wherein the computer code for assessing the risk level associated with the new virus includes:
      computer code for obtaining information associated with at least one previous virus which has caused a previous infection on the computer system; and
      computer code for comparing the information pertaining to the new virus with the information associated with the previous virus which has previously caused the previous infection on the computer system;
   wherein the previous virus and the new virus are of a first type, and the information associated with the previous virus which has caused the previous infection on the computer system includes data associated with at least one of a duration of the previous infection and a scope of the previous infection;
   wherein if the information associated with the previous virus indicates that the previous infection did not have a prolonged duration and was not widespread, the risk level includes a low risk level.

9. The computer program product as recited in claim 8 wherein the computer-readable medium is one selected from the group consisting of a hard disk, a CD-ROM, a DVD, a computer disk, a tape drive, and a computer memory.

10. A computer system, comprising:
    computer code for receiving a virus alert, the virus alert containing information pertaining to a new virus;
    computer code for assessing a risk level associated with the new virus, the risk level being arranged to indicate a risk of a infection by the new virus on the computer system;
    computer code for obtaining code when the risk level indicates that the new virus may pose a risk of the infection on the computer system, the code being configured to combat the new virus;
    a computer-readable medium that stores the computer codes; and
    a processor that executes the computer codes;
    wherein computer code for assessing the risk level associated with the new virus includes:
       computer code for obtaining information associated with at least one previous virus which has caused a previous infection on the computer system; and
       computer code for comparing the information pertaining to the new virus with the information associated with the previous virus which has previously caused the previous infection on the computer system;
    wherein the previous virus and the new virus are of a first type, and the information associated with the previous virus which has caused the previous infection on the computer system includes data associated with at least one of a duration of the previous infection and a scope of the previous infection;
    wherein if the information associated with the previous virus indicates that the previous infection did not have a prolonged duration and was not widespread, the risk level includes a low risk level.

11. The method as recited in claim 1 wherein if it is determined that the previous virus and the new virus are of different types based on the comparison, the risk level includes an unknown risk level.

12. A computer program product, comprising:
- computer code for receiving a virus alert, the virus alert containing information pertaining to a new virus;
- computer code for assessing a risk level associated with the new virus, the risk level indicating a risk of a new infection by the new virus on a computer system;
- computer code for obtaining program code when the risk level indicates that the new virus may pose a risk of the new infection on the computer system, the program code being configured to combat the new virus; and
- a computer-readable storage medium that stores the computer codes;
- wherein the computer code for assessing the risk level associated with the new virus includes:
  - computer code for obtaining information associated with at least one previous virus which has caused a previous infection on the computer system; and
  - computer code for comparing the information pertaining to the new virus with the information associated with the previous virus which has previously caused the previous infection on the computer system;
- wherein the previous virus and the new virus are of a first type, and the information associated with the previous virus which has caused the previous infection on the computer system includes data associated with at least one of a duration of the previous infection and a scope of the previous infection;
- wherein if the information associated with the previous virus indicates that the previous infection had a prolonged duration and was not widespread, the risk level includes a medium risk level.

* * * * *